United States Patent
Quan et al.

(10) Patent No.: US 11,561,462 B2
(45) Date of Patent: Jan. 24, 2023

(54) OPTICAL SYSTEM AND PROJECTION DEVICE

(71) Applicant: UNION OPTECH CO., LTD., Guangdong (CN)

(72) Inventors: Liwei Quan, Guangdong (CN); Jianhua Li, Guangdong (CN)

(73) Assignee: UNION OPTECH CO., LTD., Zhongshan (CN)

( * ) Notice: Subject to any disclaimer, the term of this patent is extended or adjusted under 35 U.S.C. 154(b) by 240 days.

(21) Appl. No.: 17/037,560

(22) Filed: Sep. 29, 2020

(65) Prior Publication Data
US 2022/0057704 A1 Feb. 24, 2022

(30) Foreign Application Priority Data

Aug. 21, 2020 (CN) .......................... 202010854272.3
Aug. 21, 2020 (CN) .......................... 202021772272.0

(51) Int. Cl.
| | | |
|---|---|---|
| *G03B 21/28* | (2006.01) | |
| *G02B 9/06* | (2006.01) | |
| *G02B 13/16* | (2006.01) | |
| *G02B 13/18* | (2006.01) | |
| *G02B 5/00* | (2006.01) | |
| *G02B 17/08* | (2006.01) | |

(52) U.S. Cl.
CPC ............. *G03B 21/28* (2013.01); *G02B 5/005* (2013.01); *G02B 9/06* (2013.01); *G02B 13/16* (2013.01); *G02B 13/18* (2013.01); *G02B 17/08* (2013.01)

(58) Field of Classification Search
CPC ............... G03B 21/005; G03B 21/006; G03B 21/008; G03B 21/28; G03B 21/145; G03B 21/208; G03B 21/2053; G02B 9/04; G02B 9/08; G02B 9/12; G02B 9/24; G02B 9/34; G02B 13/00; G02B 13/14; G02B 13/16; G02B 13/18; G02B 13/22; G02B 13/0045; G03F 7/20; G03F 7/704241; G03F 7/70275; G03F 7/70316
See application file for complete search history.

(56) References Cited

U.S. PATENT DOCUMENTS

| | | | | |
|---|---|---|---|---|
| 5,805,344 A | * | 9/1998 | Sasaya | .................... G02B 13/24 359/651 |
| 2015/0241670 A1 | * | 8/2015 | Amano | ................ G03B 21/003 359/680 |
| 2015/0370048 A1 | * | 12/2015 | Takano | .................. G02B 13/16 359/728 |
| 2019/0086635 A1 | * | 3/2019 | Lin | ....................... G02B 15/144 |
| 2019/0121093 A1 | * | 4/2019 | Gong | ................. G02B 17/0852 |

* cited by examiner

*Primary Examiner* — Sultan Chowdhury

(57) ABSTRACT

An optical system and a projection device are provided. The optical system includes a display unit, a first lens group, a second lens group, and a reflector in sequence along a transmission direction of light; both the first lens group and the second lens group have positive focal powers; the optical system satisfies the following relationship: $0.01 \leq |\varphi_{100}| \leq 0.02$ and $0.005 \leq |\varphi_{200}| \leq 0.015$; $\varphi_{100}$ represents a focal power of the first lens group, and $\varphi_{200}$ represents a focal power of the second lens group.

7 Claims, 4 Drawing Sheets

OPTICAL SYSTEM AND PROJECTION DEVICE

CROSS REFERENCE TO RELATED APPLICATIONS

The present application claims the benefit of Chinese Patent Application Nos. 202021772272.0 and 202010854272.3 filed on Aug. 21, 2020. All the above are hereby incorporated by reference. the contents of which are incorporated herein by reference in their entirety.

TECHNICAL FIELD

The present disclosure relates to the technical field of optical imaging, in particular to an optical system and a projection device.

BACKGROUND

The ultra-short focal projection optical system has been widely used in home, education, office and other fields because of its short projection distance and large projection image.

Nowadays, the ultra-short focal projection lens on the market mostly adopts the structure of refraction and reflection. In order to correct the aberration of the optical system in the projection device, multiple optical lenses are usually required to cooperate with each other in the optical system. In the related art, the refractive lens group in the optical system usually has more than 3 lens groups, and the number of lenses in each lens group is large. As a result, the optical system is larger in size and heavier in weight. When the number of lenses in the optical system is larger, the difficulty of assembling the optical system becomes higher, thereby reducing the assembly efficiency of the projection device.

The foregoing content is only used to assist in understanding the technical solution of the present disclosure, and does not mean that the foregoing content is recognized as prior art.

SUMMARY

The present disclosure provides an optical system and a projection device, aiming to solve the problems of the large number of optical lenses in the optical system of the projection device in the related art, which causes the projection device to be too large, heavy, and low in assembly efficiency.

In order to achieve the above objective, the present disclosure provides an optical system, the optical system includes a display unit, a first lens group, a second lens group, and a reflector in sequence along a transmission direction of light;

both the first lens group and the second lens group have positive focal powers;

the optical system satisfies the following relationship:

$$0.01 \le |\varphi_{100}| \le 0.02 \text{ and } 0.005 \le |\varphi_{200}| \le 0.015;$$

$\varphi_{100}$ represents a focal power of the first lens group, and $\varphi_{200}$ represents a focal power of the second lens group.

In an embodiment, the optical system satisfies the following relationship: $0.01 \le |\varphi_{100} + \varphi_{300}| \le 0.025$;

$\varphi_{100}$ represents a focal power of the first lens group, and $\varphi_{300}$ represents a focal power of the reflector.

In an embodiment, the first lens group includes a first lens, a second lens, a third lens, a fourth lens, a fifth lens, a sixth lens, a seventh lens, an eighth lens and a ninth lens in sequence along the transmission direction of light; and the second lens group includes a tenth lens, an eleventh lens, a twelfth lens, a thirteenth lens, a fourteenth lens, and a fifteenth lens in sequence along the transmission direction of light.

In an embodiment, the optical system satisfies the following relationship:

the first lens, the second lens, the third lens, the fifth lens, the sixth lens, the eighth lens, the ninth lens, the tenth lens, the eleventh lens, and the twelfth lens have positive focal powers; and the fourth lens, the seventh lens, the thirteenth lens, the fourteenth lens, and the fifteenth lens have negative focal powers.

In an embodiment, the optical system satisfies the following relationship:

$$0.98 \le T15/T \le 1.15;$$

T15 represents a distance between the first lens and the fifteenth lens, and T represents a distance between the second lens group and the reflector.

In an embodiment, the optical system satisfies the following relationship:

$$0.01 \le |\varphi_2| \le 0.015, 0.015 \le |\varphi_6| \le 0.025, 0.015 \le |\varphi_9| \le 0.25,$$
$$0.004 \le |\varphi_{15}| \le 0.05;$$

$\varphi_2$ represents a focal power of the second lens, $\varphi_6$ represents a focal power of the sixth lens, $\varphi_9$ represents a focal power of the ninth lens, $\varphi_{15}$ represents a focal power of the fifteenth lens; $|\varphi_2|$ represents an absolute value of $\varphi_2$, $|\varphi_6|$ represents an absolute value of $\varphi_6$, $|\varphi_9|$ represents an absolute value of $\varphi_9$, and $|\varphi_{15}|$ represents an absolute value of $\varphi_{15}$.

In an embodiment, the first lens group further includes a diaphragm provided between the eighth lens and the ninth lens.

In an embodiment, the optical system satisfies the following relationship:

$$d/T15 \ge 0.65;$$

d represents a distance between the fifteenth lens and the diaphragm.

In an embodiment, the optical system further includes a moving component connected to the first lens group and the second lens group, the moving component is configured to drive the first lens group and the second lens group to move in the optical system, and a moving direction of the first lens group is the same as a moving direction of the second lens group.

In order to achieve the objective, the present disclosure further provides a projection device. The projection device includes a housing and the optical system according to any one of the above embodiments, and the optical system is contained in the housing.

The present disclosure provides an optical system. The optical system includes a display unit, a first lens group, a second lens group, and a reflector in sequence along a transmission direction of light; both the first lens group and the second lens group have positive focal powers; the optical system satisfies the following relationship: $0.01 \le |\varphi_{100}| \le 0.02$ and $0.005 \le |\varphi_{200}| \le 0.015$; $\varphi_{100}$ represents a focal power of the first lens group, and $\varphi_{200}$ represents a focal power of the second lens group. In the optical system, the light emitted by the display unit is transmitted to the reflector after undergoing the combined action of the first lens group and the second lens group, and a display image is projected under the reflection of the reflector, the imaging quality of the projection device is improved through the first lens group and the second lens group, which solves the problems of the large number of optical lenses in the optical system of the projection device in the related art, resulting in the projection device being too large, heavy, and low in assembly efficiency.

BRIEF DESCRIPTION OF THE DRAWINGS

In order to more clearly illustrate the embodiments of the present disclosure, drawings used in the embodiments will be briefly described below. Obviously, the drawings in the following description are only some embodiments of the present disclosure. It will be apparent to those skilled in the art that other figures can be obtained according to the structures shown in the drawings without creative work.

DESCRIPTION OF REFERENCE NUMBER

Figure 1:
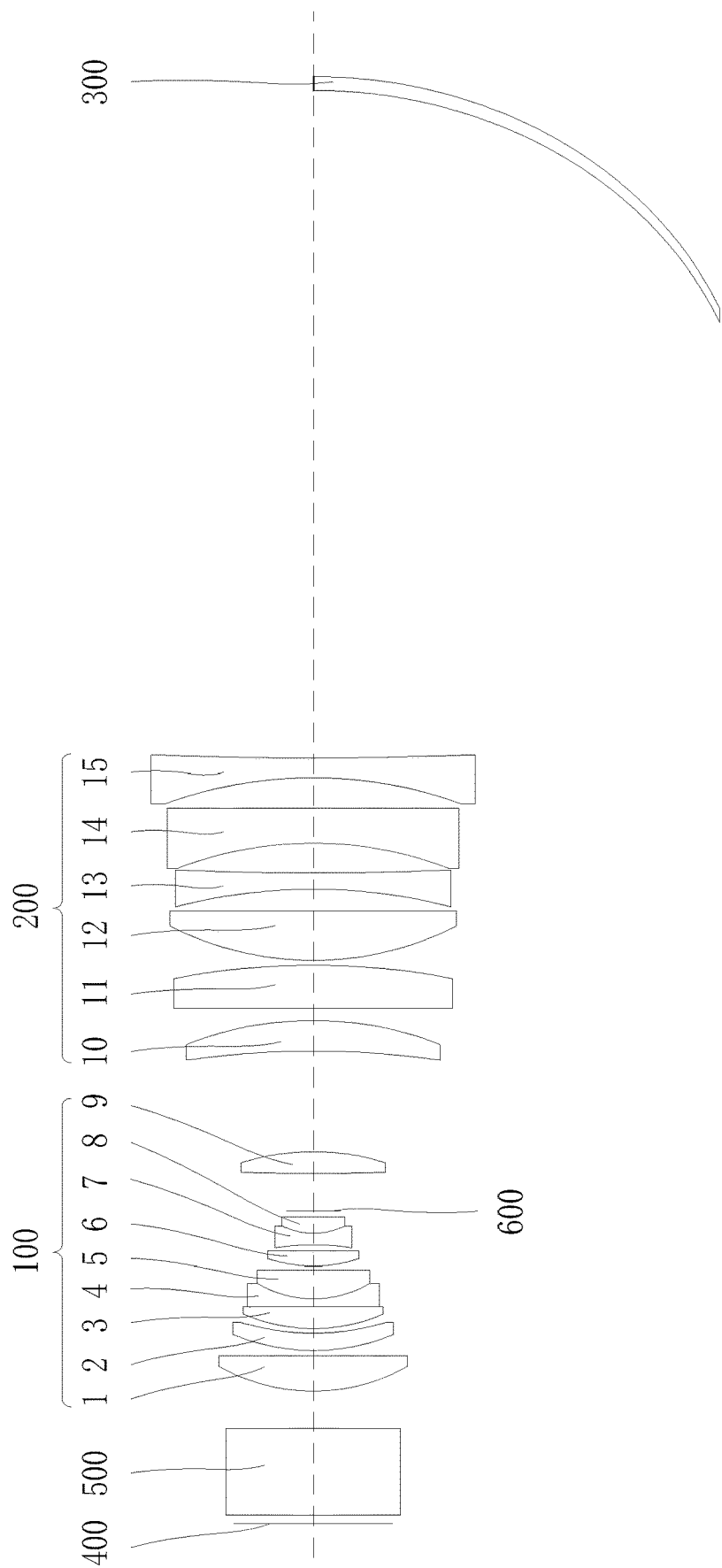
FIG. 1 is a schematic structural diagram of an optical system according to the present disclosure.

| Reference number | Name | Reference number | Name |
| --- | --- | --- | --- |
| 100 | first lens group | 9 | ninth lens |
| 200 | second lens group | 10 | tenth lens |
| 300 | reflector | 11 | eleventh lens |
| 1 | first lens | 12 | twelfth lens |
| 2 | second lens | 13 | thirteenth lens |
| 3 | third lens | 14 | fourteenth lens |
| 4 | fourth lens | 15 | fifteenth lens |
| 5 | fifth lens | 400 | display unit |
| 6 | sixth lens | 500 | turning prism |
| 7 | seventh lens | 600 | diaphragm |
| 8 | eighth lens | | |

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that all directional indicators (such as up, down, left, right, front, rear . . . ) in the embodiments of the present disclosure are only used to explain the relative positional relationship, movement, etc. between the components in a specific posture. If the specific posture changes, the directional indication changes accordingly.

Besides, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. In the description of the present disclosure, "a plurality of" means at least two, such as two, three, etc., unless otherwise specifically defined.

In the present disclosure, unless otherwise specifically specified and limited, the terms "connected", "fixed", etc. should be understood in a broad sense, for example, "fixed" can be a fixed connection, a detachable connection, or be integrated as a whole; "connected" can be a mechanical connection or an electrical connection; can be directly connected, or indirectly connected through an intermediate medium, or can be the internal communication between two elements or the interaction relationship between two elements. For those ordinary skilled in the art, the specific meaning of the above-mentioned terms in the present disclosure can be understood according to specific situations.

In addition, the technical solutions between the various embodiments of the present disclosure can be combined with each other, but must be based on the realization of those ordinary skilled in the art. When the combination of technical solutions is contradictory or cannot be achieved, it should be considered that such a combination of technical solutions does not exist, nor does it fall within the protection scope of the present disclosure.

The present disclosure provides an optical system and a projection device.

As shown in FIG. 1, the optical system includes a display unit, a first lens group, a second lens group, and a reflector in sequence along a transmission direction of light;

both the first lens group and the second lens group have positive focal power;

the optical system satisfies the following relationship:

$$0.01 \leq |\varphi_{100}| \leq 0.02 \text{ and } 0.005 \leq |\varphi_{200}| \leq 0.015;$$

$\varphi_{100}$ represents a focal power of the first lens group, and $\varphi_{200}$ represents a focal power of the second lens group. Specially, the focal power is a difference between a convergence of an image side beam and a convergence of an object side beam, and is used to express the refractive power of the optical system to incident parallel beams. The greater the positive focal power, the stronger the lens's ability to focus light, and the greater the absolute value of the negative focal power, the stronger the lens's ability to diverge light.

The present disclosure provides an optical system. The optical system includes a display unit, a first lens group, a second lens group, and a reflector in sequence along a transmission direction of light; both the first lens group and the second lens group have positive focal power; the optical system satisfies the following relationship: $0.01 \leq |\varphi_{100}| \leq 0.02$ and $0.005 \leq |\varphi_{200}| \leq 0.015$; $\varphi_{100}$ represents a focal power of the first lens group, and $\varphi_{200}$ represents a focal power of the second lens group. In the optical system, the light emitted by the display unit is transmitted to the reflector after undergoing the combined action of the first lens group and the second lens group, and a display image is projected under the reflection of the reflector, the imaging quality of the projection device is improved through the first lens group and the second lens group, which solves the problems of related art that the projection device is too large, heavy, and low in assembly efficiency due to the large number of optical lenses in the optical system of the projection device.

In an embodiment, since the projected image is usually only above the projection device when the projection device is in use, in order to save the volume and weight of the optical system, the reflector in the optical system can be arranged on one side of the optical axis of the optical system, ensuring that the light emitted by the display unit after passing through the first lens group and the second lens group, all beams are transmitted to the same side of the optical axis of the optical system, and are reflected by the reflector to the imaging surface. Compared with arranging the reflector on both sides of the optical axis, arranging the reflector on one side of the optical axis can effectively reduce the volume of the optical system.

In an embodiment, the optical system satisfies the following relationship: $0.015 \leq |\varphi_{100} + \varphi_{300}| \leq 0.025$.

$\varphi_{100}$ represents a focal power of the first lens group, and $\varphi_{300}$ represents a focal power of the reflector. When the surface type or radius of curvature of any lens in the second lens group changes, the focal power of the second lens group also changes accordingly.

In an embodiment, the first lens group includes a first lens, a second lens, a third lens, a fourth lens, a fifth lens, a sixth lens, a seventh lens, an eighth lens and a ninth lens in sequence along the transmission direction of light; and the second lens group includes a tenth lens, an eleventh lens, a twelfth lens, a thirteenth lens, a fourteenth lens, and a fifteenth lens in sequence along the transmission direction of light.

In an embodiment, the third lens, the fourth lens, and the fifth lens are cementedly connected, and the seventh lens and the eighth lens are cementedly connected.

In an embodiment, the optical system satisfies the following relationship:

the first lens, the second lens, the third lens, the fifth lens, the sixth lens, the eighth lens, the ninth lens, the tenth lens, the eleventh lens, and the twelfth lens have positive focal powers; and the fourth lens, the seventh lens, the thirteenth lens, the fourteenth lens, and the fifteenth lens have negative focal powers.

Specially, the focal powers of the first lens to the fifteenth lens are different, so that the light emitted by the display unit is refracted multiple times when passing through the first lens to the fifteenth lens, thereby the light can be transmitted to the reflector with small aberrations.

In an embodiment, the optical system satisfies the following relationship: $0.98 \leq T15/T \leq 1.15$.

T15 represents a distance between a light exit surface of the first lens and a light entrance surface of the fifteenth lens, and T represents a distance between a light exit surface of the second lens group and a reflective surface of the reflector.

In an embodiment, the optical system satisfies the following relationship:

$$0.01 \leq |\varphi_2| \leq 0.015, 0.015 \leq |\varphi_6| \leq 0.025, 0.015 \leq |\varphi_9| \leq 0.25,$$
$$0.004 \leq |\varphi_{15}| \leq 0.05;$$

$\varphi_2$ represents a focal power of the second lens, $\varphi_6$ represents a focal power of the sixth lens, $\varphi_9$ represents a focal power of the ninth lens, $\varphi_{15}$ represents a focal power of the fifteenth lens; $|\varphi_2|$ represents an absolute value of $\varphi_2$, $|\varphi_6|$ represents an absolute value of $\varphi_6$, $|\varphi_9|$ represents an absolute value of $\varphi_9$, and $|\varphi_{15}|$ represents an absolute value of $\varphi_{15}$.

In an embodiment, the first lens group further includes a diaphragm provided between the eighth lens and the ninth lens. The diaphragm refers to an optical element configured to limit the light beam in an optical system, and mainly configured to limit the size of the light or field of view of the optical system. Specifically, the diaphragm is configured to limit the size of the light entering the eighth lens from the seventh lens.

In an embodiment, the optical system satisfies the following relationship: $d/T15 \geq 0.65$.

d represents a distance between the fifteenth lens and the diaphragm.

In an embodiment, the optical system further includes a moving component connected to the first lens group and the second lens group. The moving component is configured to drive the first lens group and the second lens group to move in the optical system. In some embodiments, the moving component may be a screw rod structure or a gear structure, and the moving component further includes a control part through which the user can adjust the positions of the first lens group and the second lens group. The first lens group and the second lens group are arranged in linkage, and a moving direction of the first lens group is the same as a moving direction of the second lens group. It is understandable that the movement mode of the first lens group and the second lens group is not limited to this. The first lens group and the second lens group may also be independent of each other, and the positions of both can be adjusted through the moving component.

In an embodiment, the optical system further includes a turning prism, and the turning prism is provided on the light exit side of the first lens. In an embodiment, the turning prism is a right-angle triangular prism.

In a first embodiment, the optical system design data is shown in Table 1 below:

TABLE 1

| optical element | optical surface | surface type | radius of curvature | thickness | cone coefficient |
|---|---|---|---|---|---|
| imaging surface | | spherical | infinity | 385.95 | |
| reflector | | aspherical | −45.3687 | −121.202 | −2.046036 |
| fifteenth lens | light exit surface | aspherical | 59.81293 | −3.5 | −25.0197 |
| fifteenth lens | light entrance surface | aspherical | −32.6425 | −5.46 | 0 |
| fourteenth lens | light exit surface | spherical | infinity | −6.412 | |
| fourteenth lens | light entrance surface | spherical | −50.4653 | −5.37 | |
| thirteenth lens | light exit surface | spherical | 450 | −3 | |
| thirteenth lens | light entrance surface | spherical | −72.7378 | −3.94 | |
| twelfth lens | light exit surface | spherical | infinity | −8.98 | |
| twelfth lens | light entrance surface | spherical | 42.84021 | −0.9 | |
| eleventh lens | light exit surface | spherical | −97.1993 | −7.79 | |
| eleventh lens | light entrance surface | spherical | infinity | −2.15 | |
| tenth lens | light exit surface | spherical | −46.5143 | −5.54 | |
| tenth lens | light entrance surface | spherical | −111.444 | −18.5782 | |
| | | spherical | infinity | 0.25 | |

TABLE 1-continued

| optical element | optical surface | surface type | radius of curvature | thickness | cone coefficient |
|---|---|---|---|---|---|
| ninth lens | light exit surface | aspherical | −37.6295 | −3.94 | 0 |
| ninth lens | light entrance surface | aspherical | 148.1005 | −6.86 | 0 |
| diaphragm | | diaphragm | infinity | −1.07 | |
| eighth lens | light exit surface | spherical | infinity | −2.934 | |
| eighth lens | light entrance surface | spherical | 10 | −2.11 | |
| seventh lens | light entrance surface | spherical | −33.6024 | −1.1 | |
| sixth lens | light exit surface | aspherical | 329.9691 | −2.73 | 0 |
| sixth lens | light entrance surface | aspherical | 21.83465 | −0.7 | 0 |
| fifth lens | light exit surface | spherical | infinity | −5.2 | |
| fifth lens | light entrance surface | spherical | 15 | −1.4 | |
| forth lens | light entrance surface | spherical | infinity | −4.03 | |
| third lens | light entrance surface | spherical | 23.49514 | −0.8 | |
| second lens | light exit surface | aspherical | 127.6227 | −3.185 | |
| | light entrance surface | aspherical | 31.51227 | −0.88 | 0 |
| first lens | light exit surface | spherical | infinity | −6.489 | 0 |
| | light entrance surface | spherical | 25.86797 | −6.769 | |
| turning prism | light exit surface | spherical | infinity | −15.67 | |
| | light entrance surface | spherical | infinity | −1.52705 | |
| display unit | | imaging surface | infinity | 0 | |

The first surface 21 has an aspherical structure, as shown in Table 2.

TABLE 2

| optical element | optical surface | A1 | A2 | A3 | A4 | A5 | A6 | A7 |
|---|---|---|---|---|---|---|---|---|
| reflector | | 0 | −7.5032006e−7 | 5.7370258e−11 | −7.2209959e−15 | −7.2209959e−15 | 2.0421385e−26 | −6.5799555e−31 |
| fifteenth lens | light exit surface | 0 | −7.2459982e−6 | 2.6320077e−9 | −5.3044299e−13 | | | |
| | light entrance surface | 0 | 2.0759413e−5 | −1.0254282e−8 | 5.1283276e−12 | | | |
| ninth lens | light exit surface | 0 | −1.6783338e−5 | −3.0425875e−8 | 8.1036494e−11 | | | |
| | light entrance surface | 0 | −2.0483045e−5 | 4.9977784e−8 | −2.1903442e−11 | | | |
| sixth lens | light exit surface | 0 | −3.1092245e−5 | −8.0796083e−7 | 6.6696384e−9 | | | |
| | light entrance surface | 0 | 7.604922e−5 | −5.443206e−7 | 5.6916863e−9 | | | |
| first lens | light exit surface | 0 | 0.00010424452 | −2.41558e−7 | 7.5192266e−10 | | | |
| | light entrance surface | 0 | 3.6864737e−5 | −2.3493502e−7 | | | | |

A1, A2, A3, A4, A5, A6, and A7 represent even-order conic coefficients of the aspheric surface.

The second surface 22 is an even-order aspheric surface structure, the even-order aspheric surface satisfies the following relationship:

$$z = \frac{CY^2}{1+\sqrt{1+(1+k)C^2Y^2}} + \sum_{i=2}^{N} \alpha_i Y^{2i}$$

Y is a height of the lens center. Z is a shift value of the aspheric structure from the optical axis at the height of Y along the optical axis, taking the surface vertex as the reference. C is a radius of curvature of the apex of the aspheric surface. K is a conic coefficient; $a_i$ represents the $i^{th}$ aspheric coefficient.

In another embodiment, the second surface 22 may also be an odd-order aspheric surface structure, the odd-order aspheric surface satisfies the following relationship:

$$z = \frac{CY^2}{1+\sqrt{1+(1+k)C^2Y^2}} + \sum_{i=2}^{N} \beta_i Y^i$$

Y is a height of the lens center. Z is a shift value of the aspheric structure from the optical axis at the height of Y along the optical axis, taking the surface vertex as the reference. C is a radius of curvature of the apex of the aspheric surface. K is a conic coefficient; $\beta_i$ represents the $i^{th}$ aspheric coefficient.

In an embodiment, the parameters are as follows:

A projection range of the optical system is 0.42 m to 0.5 m.

Figure 2:
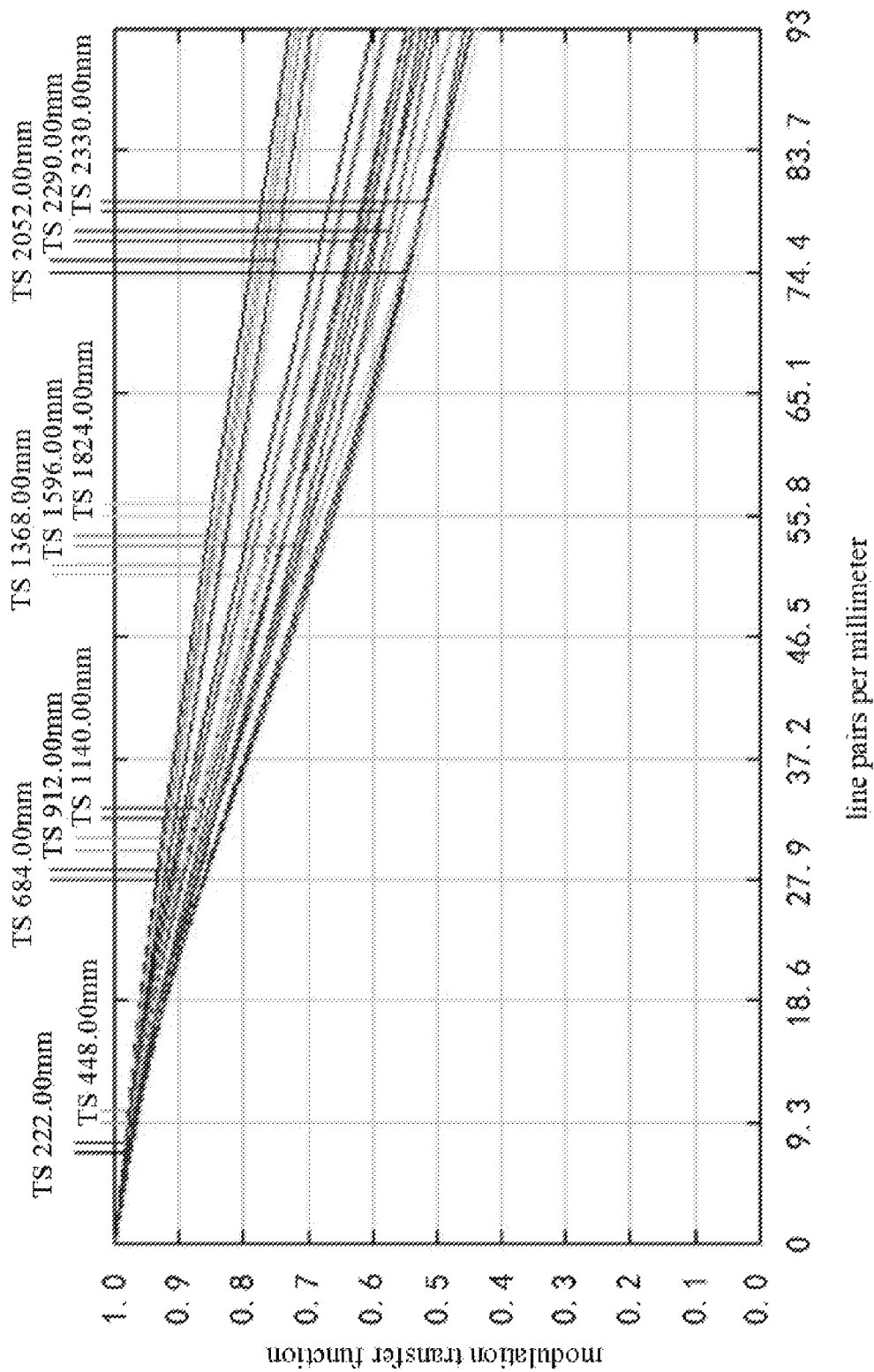
FIG. 2 is a modulation transfer function diagram of the optical system according to a first embodiment of the present disclosure.

As shown in FIG. 2, FIG. 2 is a modulation transfer function diagram according to a first embodiment. The Modulation Transfer Function (MTF) refers to a relationship between a modulation degree and line pairs per millimeter in the image, and is used to evaluate the ability to restore details of the scene. The higher the value of the vertical axis of the modulation transfer function, the higher the imaging resolution. In the first embodiment, the MTF values of the optical system in each field of view are all above 0.4.

Figure 3:
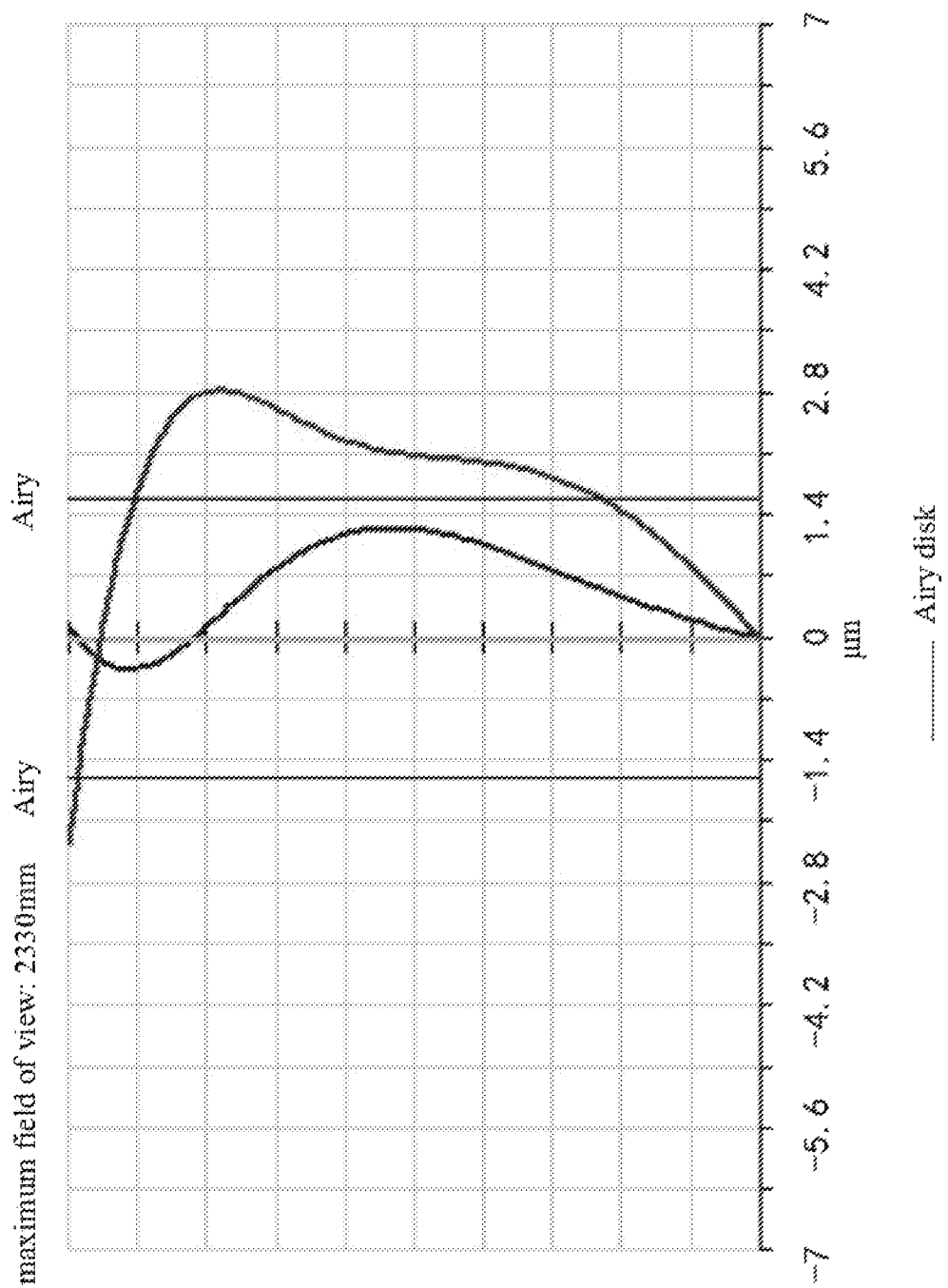
FIG. 3 is an axial chromatic aberration diagram of the optical system according to a first embodiment of the present disclosure.

As shown in FIG. 3, FIG. 3 is an axial chromatic aberration diagram according to the first embodiment. The axial chromatic aberration is also called a magnification chromatic aberration, which refers to a difference between focal positions of hydrogen blue light and hydrogen red light of the multiple rays on the imaging surface. A polychromatic chief ray of the object side becomes multiple rays when it exits from the image space due to the dispersion of the refraction system. In the first embodiment, the maximum chromatic dispersion of the optical system is the maximum position of the field of view of the optical system, and the maximum chromatic aberration value of the optical system is less than 2.8 μm.

Figure 4:
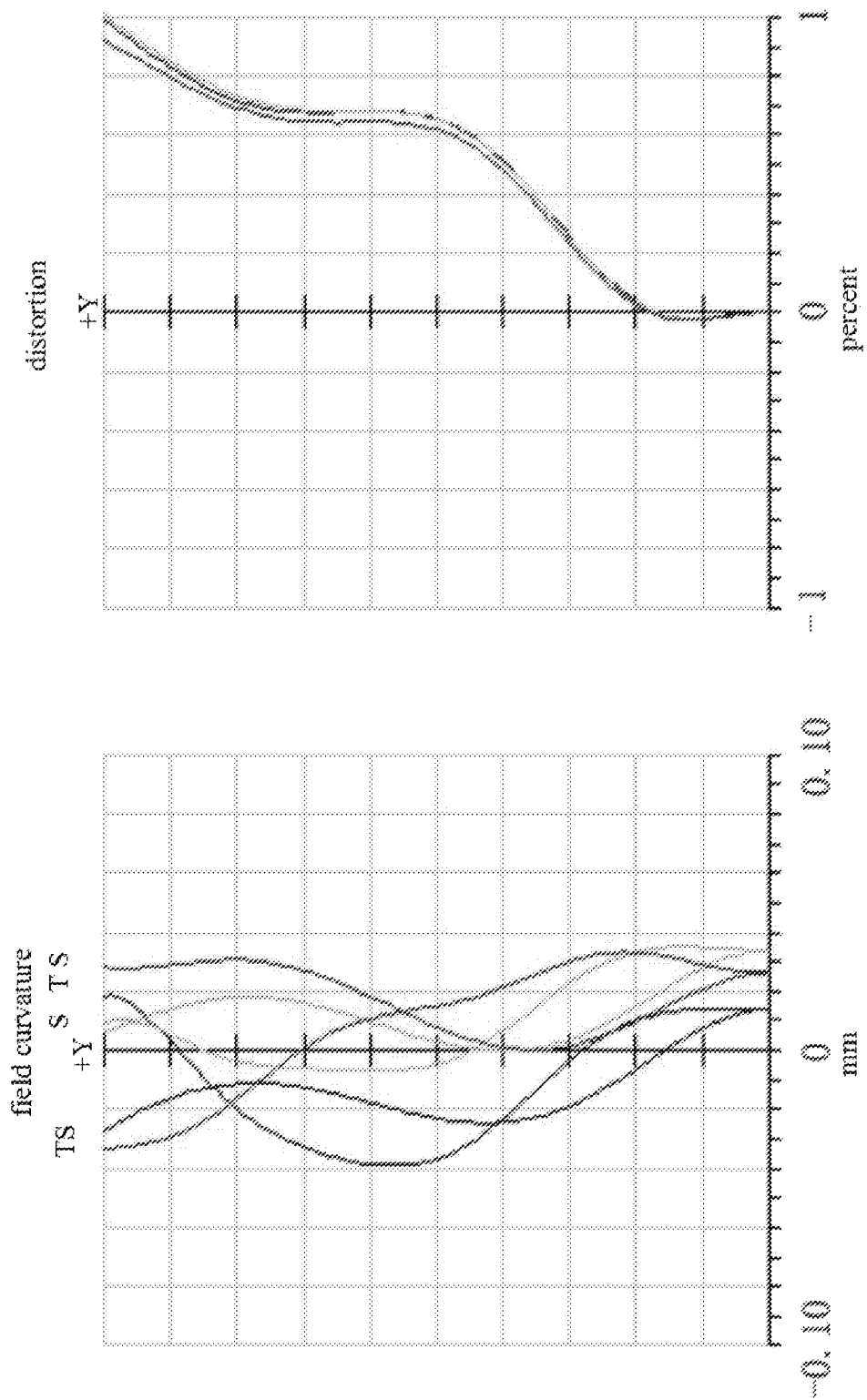
FIG. 4 is a field curvature diagram and an optical distortion diagram of the optical system according to a first embodiment of the present disclosure.

As shown in FIG. 4, FIG. 4 is a field curvature diagram and an optical distortion diagram according to the first embodiment. The field curvature indicates the change of the positions of the beam image points of different field of view points deviating from the image plane. The optical distortion refers to a vertical distance between an intersection point of a chief ray of a certain dominant wavelength of the field of view and the image plane deviating from an ideal image point. In the first embodiment, the field curvatures on the tangent plane and the sagittal plane are both less than ±0.1 mm, and the maximum distortion is less than 1%.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. An optical system, wherein the optical system comprises a display unit, a first lens group, a second lens group, and a reflector in sequence along a transmission direction of light;
   both the first lens group and the second lens group have positive focal powers;
   the optical system satisfies the following relationship:

$$0.01 \leq |\varphi 100| \leq 0.02 \text{ and } 0.005 \leq |\varphi 200| \leq 0.015;$$

$$0.015 \leq |\varphi 100 + \varphi 300| \leq 0.025$$

$\varphi 100$ represents a focal power of the first lens group, $\varphi 200$ represents a focal power of the second lens group, and $\varphi 300$ represents a focal power of the reflector.

2. The optical system of claim 1, wherein:
   the first lens group comprises a first lens, a second lens, a third lens, a fourth lens, a fifth lens, a sixth lens, a seventh lens, an eighth lens and a ninth lens in sequence along the transmission direction of light; and
   the second lens group comprises a tenth lens, an eleventh lens, a twelfth lens, a thirteenth lens, a fourteenth lens, and a fifteenth lens in sequence along the transmission direction of light.

3. The optical system of claim 2, wherein the optical system satisfies the following relationship:
   the first lens, the second lens, the third lens, the fifth lens, the sixth lens, the eighth lens, the ninth lens, the tenth lens, the eleventh lens, and the twelfth lens have positive focal powers; and
   the fourth lens, the seventh lens, the thirteenth lens, the fourteenth lens, and the fifteenth lens have negative focal powers.

4. The optical system of claim 2, wherein the optical system satisfies the following relationship:

$$0.98 \leq T15/T \leq 1.15;$$

T15 represents a distance between the first lens and the fifteenth lens, and T represents a distance between the second lens group and the reflector.

5. The optical system of claim 2, wherein the optical system satisfies the following relationship:

$$0.01 \leq |\varphi 2| \leq 0.015, 0.015 \leq |\varphi 6| \leq 0.025, 0.015 \leq |\varphi 9| \leq 0.25,$$
   $$0.004 \leq |\varphi 15| \leq 0.05;$$

$\varphi 2$ represents a focal power of the second lens, $\varphi 6$ represents a focal power of the sixth lens, $\varphi 9$ represents a focal power of the ninth lens, $\varphi 15$ represents a focal power of the fifteenth lens; $|\varphi 2|$ represents an absolute value of $\varphi 2$, $|\varphi 6|$ represents an absolute value of $\varphi 6$, $|\varphi 9|$ represents an absolute value of $\varphi 9$, and $|\varphi 15|$ represents an absolute value of $\varphi 15$.

6. The optical system of claim 3, wherein the first lens group further comprises a diaphragm provided between the eighth lens and the ninth lens.

7. The optical system of claim 6, wherein the optical system satisfies the following relationship:

$$d/T15 \geq 0.65;$$

d represents a distance between the fifteenth lens and the diaphragm.

* * * * *